(12) United States Patent
Sakargayan (10) Patent No.: US 8,204,475 B2
(45) Date of Patent: Jun. 19, 2012

(54) METHOD AND APPARATUS FOR PREVENTING UNAUTHORIZED USE OF COMPUTING DEVICES

(75) Inventor: Anupam Sakargayan, Maharashtra (IN)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 12/482,196

(22) Filed: Jun. 10, 2009

(65) Prior Publication Data

US 2010/0317320 A1    Dec. 16, 2010

(51) Int. Cl.
*H04M 1/66* (2006.01)
*H04B 1/38* (2006.01)
(52) U.S. Cl. .................. 455/410; 455/411; 455/558
(58) Field of Classification Search ............. 455/410, 455/411, 558; 380/247–250; 713/167–170, 713/187; 710/200
See application file for complete search history.

(56) References Cited

U.S. PATENT DOCUMENTS

| | | | |
|---|---|---|---|
| 5,497,411 A | 3/1996 | Pellerin | |
| 6,138,005 A * | 10/2000 | Park | 455/411 |
| 6,463,300 B1 | 10/2002 | Oshima | |
| 7,245,937 B2 * | 7/2007 | Maari | 455/558 |
| 7,496,347 B2 * | 2/2009 | Puranik | 455/410 |
| 2006/0058064 A1 * | 3/2006 | Satou | 455/558 |
| 2007/0105530 A1 * | 5/2007 | Wang | 455/411 |
| 2008/0161050 A1 * | 7/2008 | Shudark et al. | 455/558 |
| 2009/0093233 A1 * | 4/2009 | Chitlur | 455/411 |

FOREIGN PATENT DOCUMENTS

GB    2324004 A    10/1998

OTHER PUBLICATIONS

International Search Report and Written Opinion—PCT/US2010/038195—International Search Authority, European Patent Office,Jan. 12, 2011.

* cited by examiner

*Primary Examiner* — Charles Appiah
*Assistant Examiner* — Christopher Kohlman
(74) *Attorney, Agent, or Firm* — James T. Hagler (57) ABSTRACT

Methods and devices for preventing unauthorized use of mobile devices allow users to create a mobile device identification number (MDIN) which must be entered before mobile devices can access a new removable memory unit. Upon activation a mobile device may check an identifier of an installed removable memory unit to determine if the memory unit has been changed. If the mobile device determines that the memory unit is new, it may prompt the user to enter the MDIN. If the entry made by the user matches the MDIN stored in secure memory, the mobile device will access the new memory unit and function normally. However, if the entry does not match the MDIN stored in memory the mobile device may not access the new memory unit, thereby denying use of the mobile device. Example removable memory units include Subscriber Identity Modules, Universal Integrated Circuit Cards, and Removable User Identity Modules.

32 Claims, 4 Drawing Sheets

METHOD AND APPARATUS FOR PREVENTING UNAUTHORIZED USE OF COMPUTING DEVICES

FIELD OF THE INVENTION

The present invention relates generally to computing devices, and more particularly to methods and apparatus for protecting mobile devices from unauthorized use.

BACKGROUND

Recent technological developments have made wireless digital communication more and more commonplace. In addition to the ubiquitous cellular telephone, other personal mobile devices conduct digital communications with a variety of wireless networks. Many models of mobile communication devices employ provisioning data for configuring wireless communications with the provisioning data stored on an individual Subscriber Identity Module (SIM) or similar removable provisioning data memory unit. Provisioning data contains all of the necessary settings and information to enable the mobile device to establish a communication link with a particular cellular telephone or wireless network. When a mobile device is lost or stolen, a user can deactivate their account with their cellular service provider, thereby denying an unauthorized user free cellular service. However, an unauthorized user may simply replace the SIM or similar removable provisioning data memory unit with one of their own to freely use the stolen or lost mobile device. The value of mobile devices and the easy exchangeability of SIMs render mobile devices targets for theft.

SUMMARY

A method for preventing unauthorized use of mobile devices is disclosed. In the various embodiments, a personal mobile device identifier number (MDIN) for a mobile device may be created by an authorized user of a mobile device and stored in the mobile device within a secure memory that is not accessible by users or applications. An identifier (ID) for a removable memory unit, such as a removable provisioning data memory unit or SIM installed at the time the MDIN is created is also stored in the secure memory. Thereafter, when the removable memory unit or SIM is replaced, the mobile device will prompt the user to enter the MDIN before the mobile device will access the new removable memory unit, SIM or similar removable provisioning data memory unit. If the entered MDIN matches the MDIN stored in memory of the mobile device, new removable memory unit, SIM or similar removable provisioning data memory unit is accepted and its ID is recorded in the secure memory. However, if the user enters an incorrect MDIN the mobile device will ignore the removable memory unit, SIM or similar removable provisioning data memory unit and, optionally, may lock device functions rendering the mobile device useless. The MDIN may also be entered by a user as part of a procedure to change the MDIN stored in memory.

In an embodiment, when a mobile device detects a new SIM or similar removable provisioning data memory unit, it prompts the user to enter the mobile device MDIN. If the entered MDIN matches the mobile device MDIN stored in secure memory the mobile device will access the new removable memory unit, SIM, or similar removable provisioning data memory unit, record the ID of the new removable memory unit, SIM, or similar removable provisioning data memory unit in the secure memory of the mobile device and enable normal operations using the new removable memory unit, SIM or similar removable provisioning data memory unit.

In an embodiment, if a user decides to change the MDIN assigned to the mobile device, the user may make this election known, such as by activating a menu option. In response, the mobile device may prompt the user for the old MDIN. If the MDIN entered by the user matches the old MDIN stored in the secure memory, the mobile device may allow the user to enter a new MDIN which is then stored in the secure memory. However, if the MDIN entered by the user does not match the old MDIN stored in the secure memory, the mobile device may ignore the request or, optionally, may lock device functions rendering the mobile device useless.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "handheld device" refer to any one or all of wireless gaming controllers, cellular telephones, personal data assistants (PDA's), palmtop computers, wireless electronic mail receivers (e.g., the Blackberry® and Treo® devices), multimedia Internet enabled cellular telephones (e.g., the Blackberry Storm®), Global Positioning System (GPS) receivers and similar personal electronic devices which include a programmable processor and memory and utilize a removable provisioning data memory unit, such as a SIM, for storing key functional data such as provisioning information.

Many models of mobile devices require a SIM or similar removable provisioning data memory unit in which is stored the provisioning data that allows the mobile device to perform an important function, such as accessing a service provider's wireless digital communication network. The SIM is a removable memory chip or smart card used in GSM and UMTS mobile devices to store the provisioning data, such as the service-subscriber key used to identify a mobile device to wireless communication networks that enables the mobile device to access a particular communication network. The equivalent of a SIM in UMTS cellular telephone networks is called the Universal Integrated Circuit Card (UICC). CDMA cellular telephones may use an analogous Removable User Identity Module (RUIM). Without a SIM or similar removable provisioning data memory unit (e.g., UICC, RUIM, etc.) the mobile device cannot access a cellular telephone network, and thus may be rendered useless.

For ease of reference, the terms "removable memory unit" "SIM" and "removable provisioning data memory unit" are used herein to refer generally to any digital memory unit, memory chip or memory card which stores essential information for operating a mobile device, such as though not limited to provisioning data needed to access a cellular communication network. In a preferred embodiment the terms "SIM" and "removable provisioning data memory unit" refer to a removable memory unit, chip or card that stores cellular network provisioning data, such as a Subscriber Identity Module in a GSM mobile device, a Removable User Identity Module (RUIM) in a CDMA mobile device, or a Universal Integrated Circuit Card (UICC) in a UMTS mobile device. Thus, the use of the term "SIM" in the descriptions of the various embodiments is intended as an acronym encompassing all types of removable memory units including removable provisioning data memory units, such as RUIM and UICC units.

The use of a SIM is mandatory in GSM cellular telephone networks. The provisioning data stored in SIMs includes network specific information used to authenticate and identify subscribers to a network, the most important of which are the ICCID, IMSI, Authentication Key (Ki), and Local Area Identity (LAI). The SIM provisioning data also includes other carrier specific data, such as the SMSC (Short Message Service Centre) number, Service Provider Name (SPN), Service Dialing Numbers (SDN), and Value Added Service (VAS) applications.

Users can transfer provisioning data among different mobile devices by simply removing the SIM from one mobile device and inserting it into another. A typical low cost SIM has a small memory, 2-3 KB, which may only be enough to contain provisioning data and perhaps a personal phone directory. The provisioning data stored in a SIM is used by the mobile device directly. SIMs with additional applications are available in many storage sizes, the largest being capable of storing up to 1 gigabyte of information. Smaller sized SIMs, capable of storing up to 32 KB or 16 KB, are the most prevalent in areas with less-developed GSM networks.

While the portability of SIMs makes them useful for distributing provisioning data to mobile devices, their use is not without disadvantage. For example, because the SIM may be inserted into any mobile device, if the SIM is itself stolen or a mobile device containing the SIM is lost or stolen, others may utilize the information stored in the SIM to use the mobile device, such as to place cellular telephone calls, without authorization from the rightful owner. Most mobile device owners know to inform their service contract provider if their mobile device is lost or stolen in order to prevent others from using it at their expense. However, such prompt termination of cellular services alone is not sufficient to deter the theft of mobile devices, because the mobile device may still be used by simply inserting a new SIM. Thus, the theft of mobile devices remains a frequent crime in many parts of the world.

To help deter the theft of mobile devices, the various embodiments allow the user to create a personal mobile device identification number (MDIN) which must be entered before the mobile device can access a new SIM. For ease of description, the term "MDIN" is used herein as a short hand to refer to a secret code or number that a user enters into a mobile device as part of the various embodiments. The MDIN may be any code or number selected by users and need not identify a person. Thus, the term MDIN is not intended to limit the various embodiments to an identifier assigned to the mobile device by a manufacturer, such as a serial number of MAC ID. When a mobile device is activated it may check an ID associated with the installed SUM to determine if the SIM has been changed. If the mobile device determines that a new SIM has been inserted, it may prompt the user to enter the MDIN for the mobile device. If the entry made by the user matches the MDIN stored in secure memory, the mobile device will access the SIM and function normally. However, if the entry by the user does not match the MDIN stored in memory (e.g., after a number of attempts to enter the MDIN), the mobile device may not access the SIM, thereby denying use of the mobile device. In this manner, lost or stolen mobile devices cannot be misappropriated by replacing the SIM without knowing the MDINs associated with the device. By removing the economic value of lost or stolen mobile devices the various embodiments may help to deter the theft of mobile devices. Also, since a found mobile device is useless to the finder, the various embodiments may provide incentives to return found mobile devices to the rightful owners.

In overview, the various embodiments provide methods and devices for preventing unauthorized use of a memory unit with a computing device by requiring entry of a MDIN when a new memory unit is detected. In a preferred embodiment, the methods and devices prevent unauthorized use of a mobile device by requiring entry of a MDIN before the mobile device will access a newly inserted SIM. The mobile device includes a processor configured to allow a user to enter a MDIN that is stored in secure memory which cannot be accessed by users or applications. The mobile device processor is configured to recognize when a new SIM has been inserted. If a new SIM is detected, the mobile device processor may require the user to enter the correct MDIN before it will access the new SIM and resume normal mobile device functions. If the user fails to enter the correct MDIN the mobile device processor may not access the new SIM, and thus deny the functionality enabled by provisioning data stored in the SIM. In an optional embodiment, the mobile device may also respond to incorrect MDIN entries by locking some or all of the functions of the mobile device, thereby rendering the mobile device useless. In an embodiment, the mobile device may allow users to change the MDIN. In this embodiment, upon receiving a request to change the MDIN, the mobile device may prompt the user to enter the old MDIN. If the MDIN entered by the user matches the MDIN stored in secure memory, the mobile device may prompt the user to create a new MDIN which is stored in secure memory in place of the old MDIN. Thus, only a user that knows the old MDIN is allowed to make any changes to the MDIN.

Mobile devices may be configured by the manufacturer or distributor with a default MDIN, such as a string of zeros. When a user purchases a new mobile device from a manufacturer, distributer or service provider, the user may be required to enter a new MDIN into the mobile device. For example, when a user purchases a new mobile device, as part of the mobile device set-up, the salesperson or service technician may require the user to create a MDIN as part of configuring the device for use. As another example, the mobile device may be configured to detect when a MDIN has not been created and to prompt the user to enter a new MDIN before beginning normal operations. In this embodiment, the mobile device may be configured by the OEM with now MDIN or a default MDIN, such as "00000" or "01234" which may be provided to the user in the user manual, for example. Upon activation, the mobile device may check the MDIN stored in secure memory to determine if there is a stored MDIN or if the stored MDIN is the default. If no MDIN or the default MDIN is stored in memory, the mobile device may prompt the user to create a new personalized MDIN. This personalized MDIN may then be stored in secure memory for use in the future when a new SIM is detected to allow the mobile device to access the new SIM.

Figure 1:
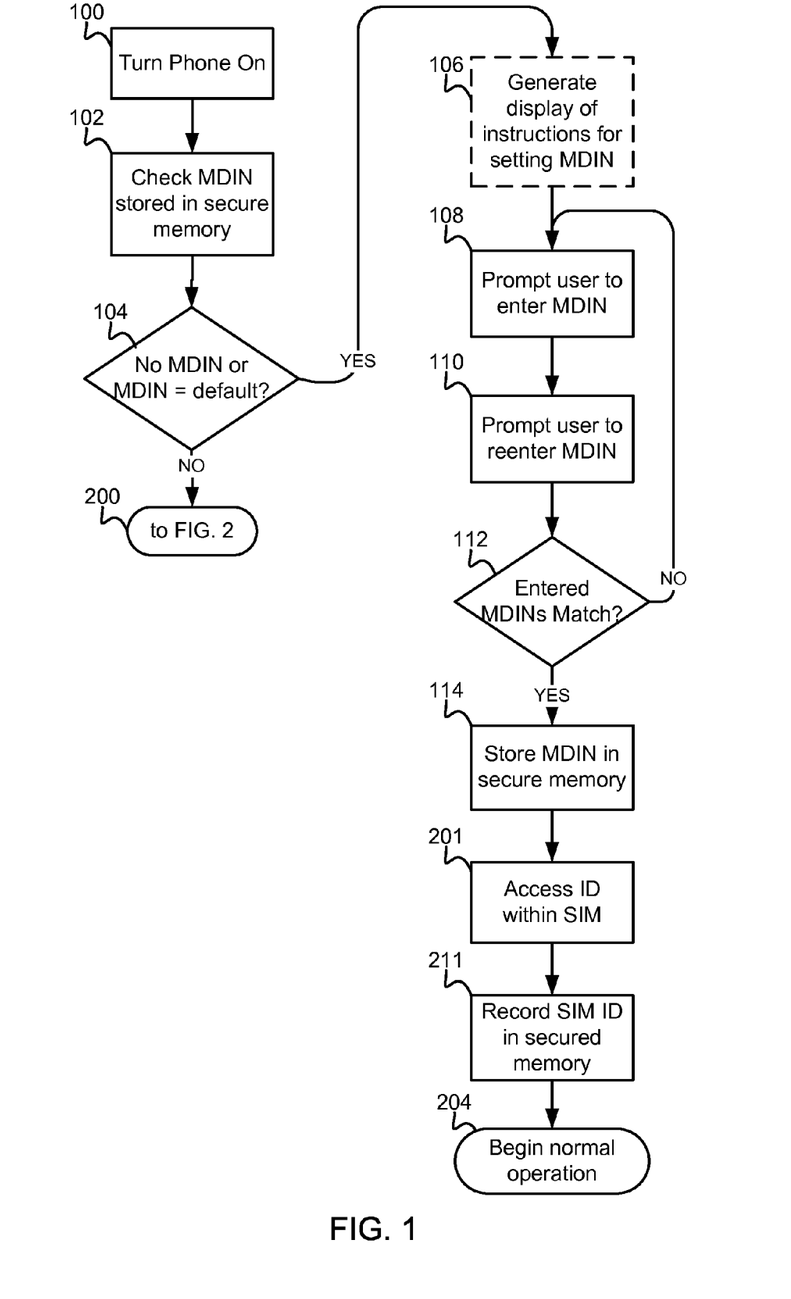
FIG. 1 is a process flow diagram of an embodiment method for creating a MDIN for a mobile device.

FIG. 1 is a process flow diagram of an embodiment method for requesting, receiving and storing a MDIN created by a user as may be implemented upon activation of a new mobile device. When a mobile device is turned on, step 100, the mobile device processor may be configured by software instructions to check the MDIN stored within secure memory as part of the boot-up processes and before accessing the provisioning data stored on a SIM, step 102. The processor may determine whether there is a MDIN stored in memory or if the stored MDIN is equal to a default value, determination 104. If there is no MDIN or the MDIN equals the default value (i.e., determination 104="YES"), such as may be the case in a new mobile device, the mobile device processor may generate a display instructing the user on setting a new MDIN, optional step 106, before accessing the SIM. For example, in an embodiment one instruction may be to enter the default MDIN provided by the manufacturer in the mobile device to begin the MDIN generation process. This option is not shown FIG. 1, but would be similar to the process described below with reference to step 302 in FIG. 3. The instructions may also explain the purpose of the MDIN and the importance of storing the MDIN in a secure location for future use. The mobile device may then prompt the user to enter a new MDIN, step 108. As part of this step the processor receives the MDIN entry and stores it in temporary memory. Once the MDIN is entered, the mobile device may prompt the user to enter the new MDIN a second time, step 110. The processor may then determine whether the first and second MDIN entries match, determination 112. Requiring two entries of the same MDIN and checking to see whether the two entries is a well known step for ensuring that the user properly entered the MDIN, and thus that the MDIN stored in memory is the same as the MDIN the user meant to input. If the first and second MDIN entries do not match (i.e., determination 112="NO"), the process may prompt the user to repeat the double entry process by returning to step 108. If the first and second MDIN entries match (i.e., determination 112="YES"), the received MDIN may be stored in the secure memory of the mobile device, step 114. Once the MDIN has been entered and stored in secure memory, the mobile device processor may access the SIM installed in the mobile device to obtain the identifier assigned to the SIM ("SIM ID") by the manufacturer, service provider or owner of the provisioning data, step 201. The processor may then copy the SIM ID to secure memory of the mobile device, step 211. Recording the SIM ID in the secure memory of the mobile device allows the mobile device processor to recognize when the SIM has been replaced as explained below with reference to FIG. 2. At this point, the mobile device may proceed with initial configuration processors or begin normal operation, step 204.

If there is a MDIN stored in memory and the MDIN is not the default value (i.e., determination 104="NO"), this indicates that the mobile device has been configured by the owner. In this case, which will be the case in all power-ups after the initial configuration, the mobile device processor may proceed with normal boot-up operations which may include the embodiment method illustrated in FIG. 2.

Figure 2:
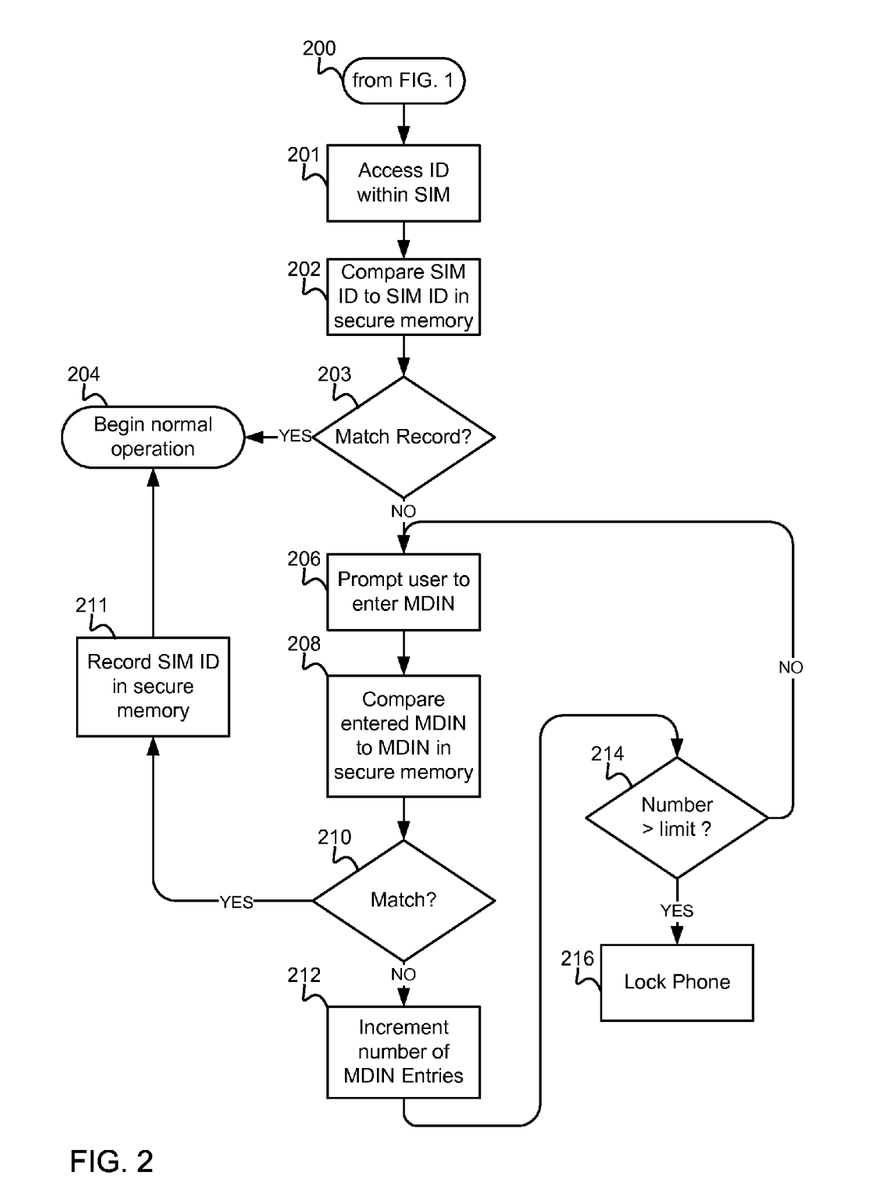
FIG. 2 is a process flow diagram of an embodiment method for determining if a removable memory unit is new, and if so comparing an entered MDIM to the mobile device MDIN before accessing the removable memory unit.

The process flow in FIG. 2 illustrates an embodiment method for determining whether the installed SIM is new, and if so, for enabling the processor to access the new SIM only if the user enters the proper MDIN. As part of the mobile device boot-up processes, which may include those described above with reference to FIG. 1, step 200, the processor may access the SIM to obtain the SIM ID, step 201, and compare this value against the SIM ID stored in the secure memory of the mobile device, step 202, to determine if the two values match, determination 203. If the processor determines that the SIM ID matches the SIM ID stored in secure memory (i.e., determination 203="YES"), the processor may be allowed to access the provisioning data of the SIM and proceed with normal functioning of the mobile device, step 204.

If the SIM ID does not match the SIM ID recorded in the secure memory (i.e., determination 203="NO"), this indicates that a new SIM has been inserted into the mobile device. Such a scenario may occur when, for example, the user switches cellular service providers by removing the old SIM inserting a new SIM containing the provisioning data for the new service provider. When this condition is determined the processor may generate a display (and optionally generate a warning sound) that prompts the user to enter the mobile device MDIN, step 206. The mobile device processor may also generate a display explaining that the mobile device will not access the new SIM until the proper MDIN is entered. The processor receives the MDIN entry and compares the entered value to the MDIN stored in secure memory, step 208, to determine whether the values match (i.e., the entered MDIN is correct), determination 210. If the entered value matches the MDIN stored in secure memory (i.e., determination 210="YES"), the processor may record the SIM ID in the secure memory, step 211. Once the new SIM ID is stored in memory the mobile device processor may begin normal operation, step 204.

In an embodiment the new SIM ID is stored in memory without replacing the old SIM ID, thereby allowing users to frequently switch between two or more SIMs without requiring entry of the MDIN each time. In an alternative embodiment the new SIM ID is stored in the same location in secure memory as the old SIM ID. In this alternative embodiment each time the SIM is replaced the processor performs the operations of prompting entry of the MDIN, comparing the entered value to the MDIN in secure memory and recording the new SIM ID in secure memory, steps 206-211, thereby replacing the old SIM ID. In a further embodiment the processor may be configured to permit the user to activate a setting which determines whether multiple SIM IDs are stored in secure memory (enabling swapping without MDIN entry) or only one SIM ID is stored in secure memory (requiring MDIN entry every time the SIM is changed out).

If the MDIN entered by the user does not match the MDIN stored in secure memory (i.e., determination 210="NO"), the processor will not access the new SIM. In an optional embodiment the processor may permit the user a limited number of retries, such as by incrementing a counter of the number of times a MDIN is entered, step 212. The processor may determine whether the incremented count of MDIN entries exceeds a predetermined limit (e.g., five, ten or more), determination 214. If the count of MDIN entries is less than the limit (i.e., determination 214="NO"), the processor may prompt the user to reenter the MDIN, returning to step 206. If the count of MDIN entries exceeds the limit (i.e., determination 214="YES"), the processor may be configured to lock the mobile device in some manner to prevent further use, optional step 216.

While the embodiment method illustrated in FIG. 2 compares the SIM ID to a value stored in secure memory, one of skill in the art would appreciate that other methods may be used to register SIMs with a mobile device and detect new SIMs. For example, the processor may be configured to generate a unique number (e.g., a HASH value) from the combination of the SIM ID and the MDIN which is compared to a value stored in secure memory. As another example, the processor may compute a unique number using an encryption-type algorithm operating on the MDIN and SIM ID and compare that value to a value saved on the SIM. In this alternative, when a new SIM is registered with the mobile device by the user entering the correct MDIN, the unique number may be calculated and stored on the SIM. If the encryption algorithm is not reversible, this embodiment may not be spoofed because an unauthorized user without knowledge of the MDIN cannot store a correct number on the SIM. This embodiment has the advantage of enabling users to register any number of SIMs with their mobile devices by inserting them into the devices and entering their MDIN one time. After each SIM has been registered the mobile device processor will be able to recognize the SIM and proceed with normal operations, step 204, without requiring entry of the MDIN.

In an embodiment, the processor may be configured to enable a user to change the MDIN assigned to a mobile device. This may be desired when a MDIN is compromised or when a mobile device is sold and the old user wants to keep his/her MDIN secret or the new user wishes to enter a MDIN that is personal and memorable. An example method for enabling a MDIN change is illustrated in process flow shown in FIG. 3.

Figure 3:
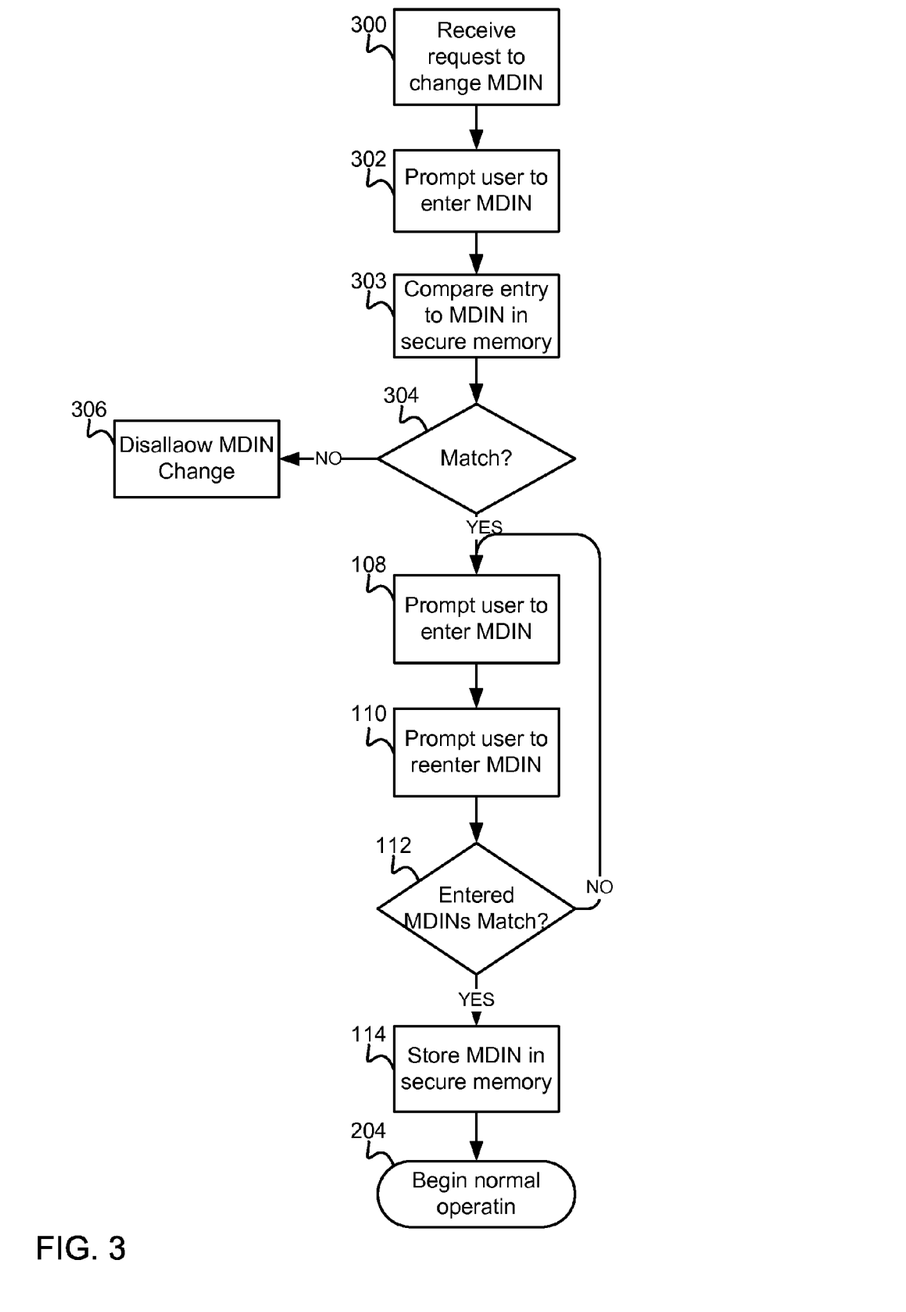
FIG. 3 is a process flow diagram of an embodiment method for changing the mobile device MDIN.

Referring to FIG. 3, the mobile device processor may be configured to receive a request from the user to change the MDIN, step 300. This request may be communicated by a button press or a user selection of a configuration menu option. For example, to change the MDIN a user may access a user interface menu, such as in the Settings menu, and select a menu option for changing the MDIN. Upon receipt of a request to change the MDIN, the processor may prompt the user to enter the current (soon to be old) MDIN, step 302. Requesting entry of the current MDIN verifies that an authorized user is attempting to change the MDIN. The processor compares the entered MDIN against the MDIN stored in the secure memory, step 303, to determine whether the two values match, determination 304. If the entered MDIN does not matches the MDIN stored in secure memory (i.e., determination 304="NO"), the processor may simply disallow a MDIN change, step 306. Optionally, in a manner similar to that described above with reference to FIG. 2, the processor may allow a limited number of user attempts to change the MDIN, and if the number of attempts exceeds a limit, the processor may lock the mobile device to disallow any further use (not shown).

If the user entered the correct MDIN (i.e., determination 304="YES"), the processor may allow a MDIN change to proceed by prompting the user to enter a new MDIN, step 108. As described above with reference to FIG. 1, the processor may prompt the user for a second MDIN entry, step 110, and compare the two entered values to determine if they match, determination 112. If the two MDIN entries do not match (i.e., determination 112="NO"), the processor may prompt the user to repeat the double entry process by returning to step 108. If the first and second MDIN entries match (i.e., determination 112="YES"), the received new MDIN may be stored in the secure memory of the mobile device thereby replacing the old MDIN, step 114. Once the MDIN has been entered and stored in secure memory, the mobile device processor may return to normal operation, step 204.

Figure 4:
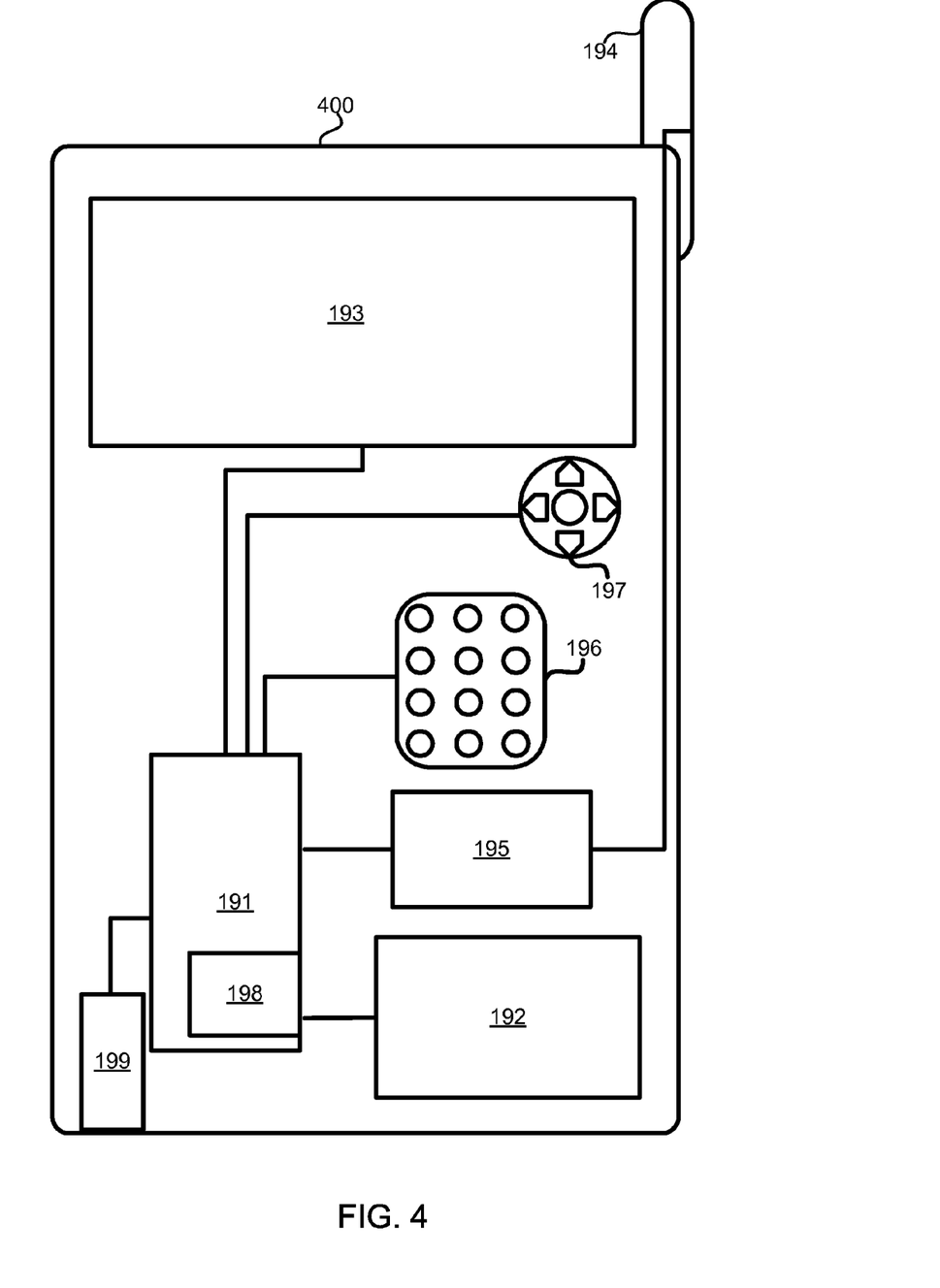
FIG. 4 is a system block diagram of a mobile device suitable for use in an embodiment.

Typical mobile devices suitable for use with the various embodiments will have in common the components illustrated in FIG. 4. For example, the exemplary mobile device 400 may include a processor 191 coupled to internal memory 192, a display 193 and to a SIM 199 or similar removable memory unit. Additionally, the mobile device 400 may have an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications are collectively referred to as the air interface since it provides a data interface via a wireless data link. Mobile devices typically also include a key pad 196 or miniature keyboard and menu selection buttons or rocker switches 197 for receiving user inputs.

The processor 191 may be any programmable microprocessor, microcomputer or multiple processor chip or chips that can be configured by software instructions (applications) to perform a variety of functions, including the functions of the various embodiments described herein. In some mobile devices, multiple processors 191 may be provided, such as one processor dedicated to wireless communication functions and one processor dedicated to running other applications. Typically, software applications may be stored in the internal memory 192 before they are accessed and loaded into the processor 191. In some mobile devices, the processor 191 may include internal memory sufficient to store the application software instructions. The internal memory of the processor may include a secure memory 198 which is not directly accessible by users or applications and that is capable of recording MDINs and SIM IDs as described in the various embodiments. As part of the processor, such a secure memory 198 may not be replaced or accessed without damaging or replacing the processor. In some mobile devices, additional memory chips (e.g., a Secure Data (SD) card) may be plugged into the device 400 and coupled to the processor 191. In many mobile devices, the internal memory 192 may be a volatile or nonvolatile memory, such as flash memory, or a mixture of both. For the purposes of this description, a general reference to memory refers to all memory accessible by the processor 191, including internal memory 192, removable memory plugged into the mobile device, and memory within the processor 191 itself, including the secure memory 198.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for protecting a mobile device from unauthorized use, comprising:
   determining that a removable provisioning data memory unit is new to the mobile device comprising:
      accessing the removable provisioning data memory unit installed in the mobile device to obtain an identifier;
      computing a first value from a combination of a mobile device identification number (MDIN) stored in a secure memory and the obtained identifier; and
      comparing the computed first value to one or more values previously stored in the secure memory of the mobile device;
   prompting a user to enter a MDIN in response to determining that the removable provisioning data memory unit is new to the mobile device;
   comparing an entered MDIN to the MDIN stored in the secure memory of the mobile device;
   storing the computed first value in the secure memory of the mobile device without replacing any of the one or more values previously stored in the secure memory of the mobile device if the entered MDIN matches the MDIN stored in the secure memory; and
   accessing the removable provisioning data memory unit only if the entered MDIN matches the MDIN stored in the secure memory.

2. The method of claim 1, further comprising:
   incrementing a counter if the entered MDIN does not match the MDIN stored in secure memory; and
   locking at least a portion of the mobile device functionality if the counter exceeds a predetermined limit.

3. The method of claim 1, further comprising:
   determining if a MDIN is stored in the secure memory;
   prompting the user to enter a MDIN if there is no MDIN stored in the secure memory; and
   storing the entered MDIN in the secure memory.

4. The method of claim 1, further comprising:
   determining if the MDIN stored in the secure memory equals a default value;
   prompting the user to enter a MDIN if the MDIN stored in the secure memory equals a default value; and
   storing the entered MDIN in the secure memory.

5. The method of claim 1, further comprising:
   receiving a request to change the MDIN;
   prompting the user to enter the MDIN;
   comparing the entered MDIN to the MDIN stored in the secure memory;
   prompting the user to enter a new MDIN if the entered MDIN matches the MDIN stored in the secure memory; and
   storing the entered MDIN in the secure memory.

6. A mobile device, comprising:
   a processor;
   a display coupled to the processor;
   a secure memory coupled to the processor; and
   a removable data memory unit coupled to the processor, wherein the processor is configured with software instructions to perform steps comprising:
      determining that the removable memory unit is new to the mobile device comprising:

accessing the removable provisioning data memory unit installed in the mobile device to obtain an identifier, computing a first value from a combination of a mobile device identification number (MDIN) stored in the secure memory and the obtained identifier; and comparing the computed first value to one or more values previously stored in the secure memory of the mobile device;

generating a prompt on the display prompting a user to enter a MDIN in response to determining that the removable provisioning data memory unit is new to the mobile device;

comparing an entered MDIN to the MDIN stored in the secure memory of the mobile device;

storing the computed first value in the secure memory of the mobile device without replacing any of the one or more values previously stored in the secure memory of the mobile device if the entered MDIN matches the MDIN stored in the secure memory; and accessing the removable provisioning data memory unit only if the entered MDIN matches the MDIN stored in the secure memory.

7. The mobile device of claim 6, wherein the processor is configured with software instructions to perform further steps comprising:

incrementing a counter if the entered MDIN does not match the MDIN stored in secure memory; and locking at least a portion of the mobile device functionality if the counter exceeds a predetermined limit.

8. The mobile device of claim 6, wherein the processor is configured with software instructions to perform further steps comprising:

determining if a MDIN is stored in the secure memory;

prompting the user to enter a MDIN if there is no MDIN stored in the secure memory; and storing the entered MDIN in the secure memory.

9. The mobile device of claim 6, wherein the processor is configured with software instructions to perform further steps comprising:

determining if the MDIN stored in the secure memory equals a default value;

prompting the user to enter a MDIN if the MDIN stored in the secure memory equals a default value; and storing the entered MDIN in the secure memory.

10. The mobile device of claim 6, wherein the processor is configured with software instructions to perform further steps comprising:

receiving a request to change the MDIN;

generating a prompt on the display prompting the user to enter the MDIN;

comparing an entered MDIN to the MDIN stored in the secure memory;

prompting the user to enter a new MDIN if the entered MDIN matches the MDIN stored in the secure memory; and storing the entered MDIN in the secure memory.

11. The mobile device of claim 6, further comprising a transceiver coupled to the processor, the transceiver configured to connect to a cellular communication network, wherein the processor is further configured to communicate with the cellular communication network using provisioning data stored in the removable memory unit.

12. The mobile device of claim 11, wherein the removable memory unit is a Subscriber Identity Module (SIM).

13. The mobile device of claim 11, wherein the removable memory unit is a Universal Integrated Circuit Card (UICC).

14. The mobile device of claim 11, wherein the removable memory unit is a Removable User Identity Module (RUIM).

15. A mobile device, comprising:

means for determining that a removable memory unit is new to the mobile device comprising:

means for accessing the removable provisioning data memory unit installed in the mobile device to obtain an identifier;

means for computing a first value from a combination of a mobile device identification number (MDIN) stored in a secure memory and the obtained identifier; and means for comparing the computed first value to one or more values previously stored in the secure memory of the mobile device;

means for prompting a user to enter a MDIN in response to determining that the removable memory unit is new to the mobile device;

means for comparing an entered MDIN to the MDIN stored in the secure memory of the mobile device;

means for storing the computed first value in the secure memory of the mobile device without replacing any of the one or more values previously stored in the secure memory of the mobile device if the entered MDIN matches the MDIN stored in the secure memory; and means for accessing the removable memory unit only if the entered MDIN matches the MDIN stored in the secure memory.

16. The mobile device of claim 15, further comprising:

means for incrementing a counter if the entered MDIN does not match the MDIN stored in secure memory; and means for locking at least a portion of the mobile device functionality if the counter exceeds a predetermined limit.

17. The mobile device of claim 15, further comprising:

means for determining if a MDIN is stored in the secure memory;

means for prompting the user to enter a MDIN if there is no MDIN stored in the secure memory; and means for storing the entered MDIN in the secure memory.

18. The mobile device of claim 15, further comprising:

means for determining if the MDIN stored in the secure memory equals a default value;

means for prompting the user to enter a MDIN if the MDIN stored in the secure memory equals a default value; and means for storing the entered MDIN in the secure memory.

19. The mobile device of claim 15, further comprising:

means for receiving a request to change the MDIN;

means for prompting the user to enter the MDIN;

means for comparing the entered MDIN to the MDIN stored in the secure memory;

means for prompting the user to enter a new MDIN if the entered MDIN matches the MDIN stored in the secure memory; and means for storing the entered MDIN in the secure memory.

20. The mobile device of claim 15, further comprising means for communicating with a cellular communication network using provisioning data stored in the removable memory unit.

21. The mobile device of claim 20, wherein the removable memory unit is a Subscriber Identity Module (SIM).

22. The mobile device of claim 20, wherein the removable memory unit is a Universal Integrated Circuit Card (UICC).

23. The mobile device of claim 20, wherein the removable memory unit is a Removable User Identity Module (RUIM).

24. A non-transitory computer readable storage medium having stored thereon processor-executable software instructions configured to cause a processor of a mobile device to perform operations comprising:
    determining that a removable memory unit is new to the mobile device, wherein determining that the removable memory unit is new to the mobile device comprises:
        accessing the removable provisioning data memory unit installed in the mobile device to obtain an identifier;
        computing a first value from a combination of a mobile device identification number (MDIN) stored in a secure memory and the obtained identifier; and
        comparing the computed first value to one or more values previously stored in the secure memory of the mobile device;
    prompting a user to enter a MDIN in response to determining that the removable memory unit is new to the mobile device;
    comparing an entered MDIN to a MDIN stored in the secure memory; and
    accessing the removable memory unit only if the entered MDIN matches the MDIN stored in the secure memory.

25. The non-transitory computer readable storage medium of claim 24, wherein the non-transitory computer readable storage medium has stored thereon processor-executable software instructions configured to cause a processor to perform further operations comprising:
    incrementing a counter if the entered MDIN does not match the MDIN stored in secure memory; and
    locking at least a portion of the mobile device functionality if the counter exceeds a predetermined limit.

26. The non-transitory computer readable storage medium of claim 24, wherein the non-transitory computer readable storage medium has stored thereon processor-executable software instructions configured to cause a processor to perform further operations comprising:
    determining if a MDIN is stored in the secure memory;
    prompting the user to enter a MDIN if there is no MDIN stored in the secure memory; and
    storing the entered MDIN in the secure memory.

27. The non-transitory computer readable storage medium of claim 24, wherein the non-transitory computer readable storage medium has stored thereon processor-executable software instructions configured to cause a processor to perform further operations comprising:
    determining if the MDIN stored in the secure memory equals a default value;
    prompting the user to enter a MDIN if the MDIN stored in the secure memory equals a default value; and
    storing the entered MDIN in the secure memory.

28. The non-transitory computer readable storage medium of claim 24, wherein the non-transitory computer readable storage medium has stored thereon processor-executable software instructions configured to cause a processor to perform further operations comprising:
    receiving a request to change the MDIN;
    prompting the user to enter the MDIN;
    comparing an entered MDIN to the MDIN stored in the secure memory;
    prompting the user to enter a new MDIN if the entered MDIN matches the MDIN stored in the secure memory; and
    storing the entered MDIN in the secure memory.

29. The non-transitory computer readable storage medium of claim 24, wherein the non-transitory computer readable storage medium has stored thereon processor-executable software instructions configured to cause a processor to perform further operations comprising communicating with a cellular communication network using provisioning data stored in the removable memory unit.

30. The non-transitory computer readable storage medium of claim 29, wherein the removable memory unit is a Subscriber Identity Module (SIM).

31. The non-transitory computer readable storage medium of claim 29, wherein the removable memory unit is a Universal Integrated Circuit Card (UICC).

32. The non-transitory computer readable storage medium of claim 29, wherein the removable memory unit is a Removable User Identity Module (RUIM).

* * * * *